United States Patent [19]

Okuda et al.

[11] Patent Number: 4,736,937
[45] Date of Patent: Apr. 12, 1988

[54] AUTOMATIC DOCUMENT FEEDER

[75] Inventors: Masakiyo Okuda, Kashiwara; Kazuyuki Ohnishi, Nara, both of Japan

[73] Assignee: Sharp Kabushiki Kaisha, Osaka, Japan

[21] Appl. No.: 812,916

[22] Filed: Dec. 23, 1985

[30] Foreign Application Priority Data

Dec. 26, 1984 [JP] Japan .................................. 59-276616

[51] Int. Cl.⁴ ............................................. B65H 3/44
[52] U.S. Cl. .......................................... 271/4; 271/9; 271/25 G; 271/301; 271/902; 355/14 SH
[58] Field of Search ......................... 271/3.1, 4, 301, 9, 271/902, 258; 355/3 SH, 14 SH

[56] References Cited

U.S. PATENT DOCUMENTS 4,579,326 4/1986 Pinckney et al. ..................... 271/3.1
4,579,327 4/1986 Furuichi ................................. 271/3.1

FOREIGN PATENT DOCUMENTS 0023544 2/1981 European Pat. Off. .
3542895 6/1986 Fed. Rep. of Germany .

Primary Examiner—Joseph J. Rolla
Assistant Examiner—Frederick R. Handren
Attorney, Agent, or Firm—Birch, Stewart, Kolasch & Birch

[57] ABSTRACT

An automatic document feeder for an electrophotographic copying machine comprises a plurality of document trays each for piling a plurality of documents thereon, a plurality of document exhaust trays each for receiving the documents, document exhaust rollers rotating to transport the documents into one of the plurality of document exhaust trays, and a switching gate for selecting the way of transporting the documents into anyone of the plurality of document exhaust trays. A document transport belt is provided for transporting the documents. The document exhaust rollers and the document transport belt can be driven in bidirectional directions.

6 Claims, 2 Drawing Sheets

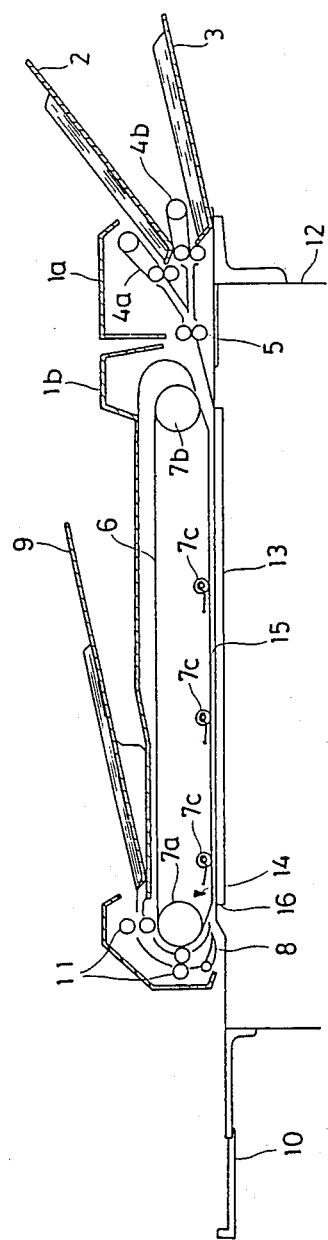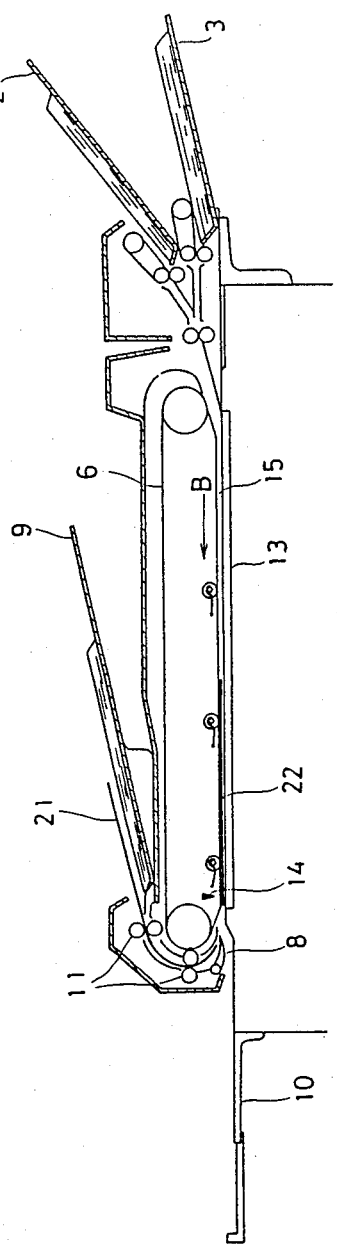

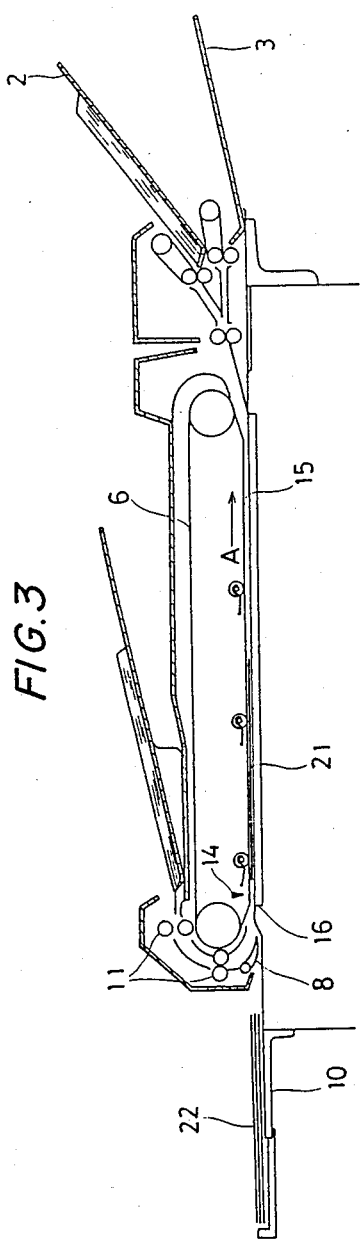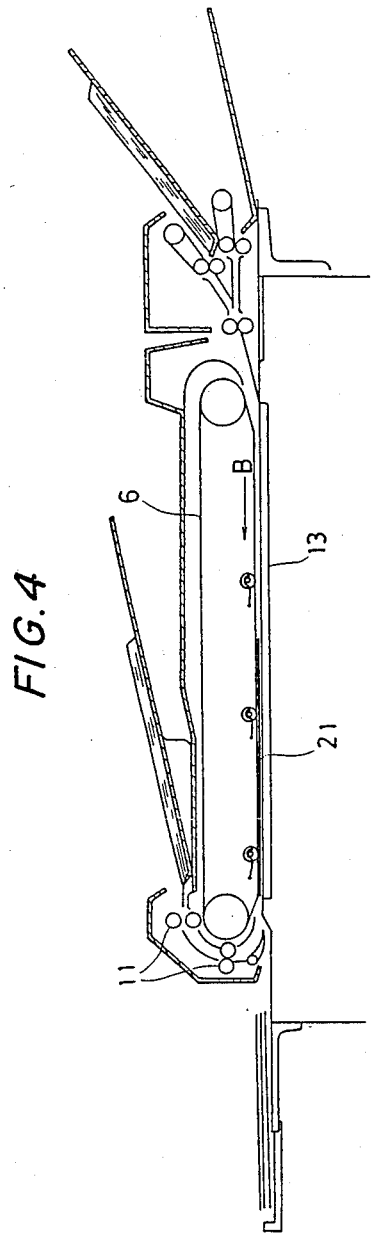

AUTOMATIC DOCUMENT FEEDER

BACKGROUND OF THE INVENTION

The present invention relates to a document feeder for an electrophotographic copying machine and, more particularly, to an automatic document feed for an electrophotographic copying machine which easily allows interrupted copying operation.

An electrophotographic copying machine produces an electrostatic latent image onto a photoreceptor corresponding to a pattern image of a document, such as a book to be copied. Toner particles are electrostatically adhered to the latent image so that the latent image becomes visible as a toner image. The toner image on the photoreceptor is transferred onto a copy paper via a transference charger. An automatic document feeder may be, if desired, coupled to the copying machine for automatically and subsequently feeding a plurality of copy documents onto a light scanning table to subsequently copy the documents.

Conventionally, while such an automatic document feeder coupled to the copying machine is being operated any copy interruption for copying one or more new documents, except for the documents piled on the document tray, may be difficult because it will take a long time to copy all of the documents.

SUMMARY OF THE INVENTION

Accordingly, it is an object of the present invention to provide an improved automatic document feeder for an electrophotographic copying machine for promptly allowing any interruption of the copy operation.

It is another object of the present invention to provide an improved automatic document feeder for an electrophotographic copying machine for simplifying the replacement of one or more copy documents between an automatic document feeder mode and an interruption copy operation mode.

Briefly described, in accordance with the present invention, an automatic document feeder for an electrophotographic copying machine comprises a plurality of trays each for piling a plurality of documents thereon, a plurality of document exhaust trays each for receiving the plurality of document, exhaust rollers for one of the plurality of exhaust trays, and switching gate means for selecting the transport path of the documents into any one of the plurality of document exhaust trays. The exhaust rollers and a transport belt can be driven in the bidirectional directions.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a side sectional view of an automatic document feeder for an electrophotographic copying machine according to the present invention; and FIGS. 2 through 4 show the operation of the automatic document feeder of FIG. 1.

DESCRIPTION OF THE INVENTION

FIG. 1 shows a side sectional view of an automatic document feeder for an electrophotographic copying machine according to the present invention.

Referring to FIG. 1, the automatic document feeder of the copying machine mainly comprises a document supply section 1a and a document transport section 1b. The document supply section 1a comprises first and second document trays each for piling on a plurality of copy documents, and document supply belts 4a and 4b for supplying each one of the documents. A pair of feeding rollers 5 are provided at the outlet of the documents from the document supply section 1a.

Inside the document transport section 1b, a transport belt 6 is extended between drive rollers 7a and 7b so as to make a document transport path 15 above a document table 13 of the body 12 of the copy machine. The surface of the belt 6 facing the document table 13 is stressed toward the document table 13 by belt rollers 7c. At the outlet of the document transport section 1b, a plurality of document exhaust rollers 11 and a switching gate 8 are provided.

According to the present invention, the exhaust rollers 11 and the transport belt 6 can be driven in bidirectional directions. The switching gate 8 is provided for selecting the transport path of the document into either of a first document exhaust tray 9 and a second document exhaust tray 10. The first document exhaust tray 9 is positioned at the upper side of the document transport section 1b. The second document exhaust tray 10 is positioned at the left side of the body 12 of the copying machine. A sensor 14 is provided adjacent the drive roller 7a in the document transport section 1b for detecting the transport of the document.

FIGS. 2 through 4 show the operation of the automatic document feeder of the present invention.

Assuming that an interruption of one or more new copy documents is selected while the automatic document feeding operation is continued in connection with a plurality of documents being piled on the document tray 2, one document 21 presently mounted on the document table 13 is transported toward the document exhaust tray 9 with the transport belt 6 and the exhaust rollers even before all the copies in connection with that document 21 have been made in the automatic document feeding mode. When a predetermined time passes after the rear end of the document 21 passes the sensor 14, the exhaust rollers 11 stop driving. As shown in FIG. 2, the document 21 is stopped, being supported by the exhaust rollers 11.

For the interruption copy mode, one or more extra copy documents are piled on the second document tray 3. They are subsequently fed by the transport belt 6 in the B direction so as to reach the appropriate position 16 on the document table 13 and copy them in the interruption copying mode. In this case, the switching gate 8 is positioned so as to open the outlet toward the second document exhaust tray 10. After one or more extra copy documents 22 are copied, they are exhausted onto the document exhaust tray 10 by the transport belt 6.

As shown in FIG. 3, after all of the extra copy documents on the second document tray 3 have been copied, the switching gate 8 is positioned so as to open the path between the first document tray 9 and the document table 13. Then, the transport belt 6 and the exhaust rollers 11 are driven in reverse to return the document 21 for the normal copying operation onto the document table 13 through the transport path 15. When another predetermined time passes after the rear end of the document 21 passes the sensor 14, the driving the of exhaust rollers 11 and the transport belt 6 are stopped.

As shown in FIG. 4, the transport belt 6 is somewhat rotated in the B direction so as to accurately position and stop the document 21 at the light scanning position on the document table 13. The normal copying operation is now started again. The documents for the normal copying mode are exhausted necessarily onto the first document exhaust tray 9 by the rotation of exhaust rollers 11 and the positioning of the switching gate 8.

As described above, according to the present invention, the switching gate 8 is operated to separate the two kinds of documents during the normal copying mode and the interruption copying mode. The two kinds of documents cannot be mixed. Further, as shown in FIGS. 3 and 4, to accurately position the document 21 at the appropriate position 16 of the transport path 15 on being returned to the document table 13, the rotation of the transport belt 6 is stopped when a predetermined time passes after the rear end of the document 21 passes the sensor 14. The document 21 is overrun from the appropriate position 16 and then returned to the same position 16. The returned document 21 cannot be shifted from its appropriate position 16 unless initiated by the interruption copying operation.

While only certain embodiments of the present invention have been described, it will be apparent to those skilled in the art that various changes and modifications may be made therein without departing from the sprit and scope of the present invention as claimed.

What is claimed is:

1. An electrophotographic copying machine comprising:

a document supply section including first and second document feed trays for piling a plurality of copy documents thereon, one of said document feed trays for supporting documents for a normal copying mode and the other of said document feed trays for supporting documents for an interruption copying mode;

a first document exhaust tray for receiving said copy documents from said one of said document feed trays for said normal copying mode and a second document exhaust tray for receiving said copy documents from said other document feed tray for said interruption copying mode;

a document transport section inclusive of a light scanning position and transport belt for transporting said copy documents from said document supply section to said exhaust trays after light scanning said document;

switching gate means for selectively directing said copy documents to one of said first and second exhaust trays; and document exhaust rollers for transporting said copy documents fed from said one document feed tray via said transport belt to said first document exhaust tray during said normal copying mode, said document exhaust rollers and said transport belt being reversibly rotatable for transporting documents in bidirectional directions.

2. The electrophotographic copying machine of claim 1, further including a sensor means for detecting the passage of a trailing edge of a copy document in either of said bidirectional directions.

3. The electrophotographic copying machine of claim 1, wherein said exhaust rollers support a copy document fed from said one document feed tray during copying of a copy document fed from said other document feed tray and, upon completion of copying of said copy document from said other document feed tray and exhausting thereof to said second document exhaust tray, returns said copy document being held to said transport belt of said transport section for completion of said normal copying mode.

4. The electrophotographic copying machine of claim 3, further including means for rotating said transport belt so as to accurately position and stop said returned copy document at said light scanning position.

5. An electrophotographic copying machine comprising:

a plurality of document feed trays for piling a plurality of copy documents thereon;

a plurality of document exhaust trays for receiving said plurality of copy documents thereon;

a document transport belt for transporting said copy documents from said document feed trays to said document exhaust trays;

switching gate means for selectively directing said copy documents to one of said plurality of document exhaust trays; and document exhaust rollers for exhausting said plurality of copy documents, said document exhaust rollers rotating so as to transport said copy documents to one of said plurality of document exhaust trays, said document exhaust rollers and said transport belt being rotatable in bidirectional directions.

6. The electrophotographic copying machine of claim 5, further including a sensor means for detecting the passage of a trailing edge of a copy document in either of said bidirectional directions.

* * * * *